United States Patent [19]
Kauffman et al.

[11] 3,744,768
[45] July 10, 1973

[54] MIXER SYSTEM

[75] Inventors: John H. Kauffman, Crystal Lake; Ralph J. Donat, Chicago, both of Ill.

[73] Assignee: National Engineering Co., Chicago, Ill.

[22] Filed: Aug. 30, 1971

[21] Appl. No.: 176,011

[52] U.S. Cl. ............... 259/154, 259/168, 259/179
[51] Int. Cl. ............................................. B28c 7/04
[58] Field of Search .................. 259/154, 148, 149, 259/164, 168, 178 R, 178 A, 179, 107, 108, 9, 10, 23, 24; 241/110, 124, 128, 41, 42

[56] References Cited
UNITED STATES PATENTS

| 3,667,737 | 6/1972 | Howe | 259/178 A |
| 3,081,983 | 3/1963 | Thibodeaux | 259/178 A |
| 3,136,490 | 6/1964 | Doughty | 241/124 |
| 3,480,260 | 11/1969 | Fejmert | 259/168 |
| 2,954,215 | 9/1960 | Warmkessel | 259/154 |
| 3,249,970 | 5/1966 | Hartley | 259/154 |
| 3,161,927 | 12/1964 | Dietert | 259/154 |

*Primary Examiner*—Robert W. Jenkins
*Attorney*—Mason, Kolehmainen, Rathburn & Wyss

[57] ABSTRACT

A mixer system for granulated material, and the like, comprising a mixing chamber having a wall surface, plow means for moving material around the chamber including an edge portion movable across and in close proximity to the surface. Fluid dispenser means is provided for delivering coolant and lubricating fluid directly onto the edge portion of the plow means for cooling the same and reducing friction between the plow means and the chamber wall surface as well as for wetting the material. Control means is provided for controlling the time interval and/or flow rate that the dispenser means is operative for dispensing the fluid, thereby controlling the moisturization of the material in the mixing chamber.

10 Claims, 7 Drawing Figures

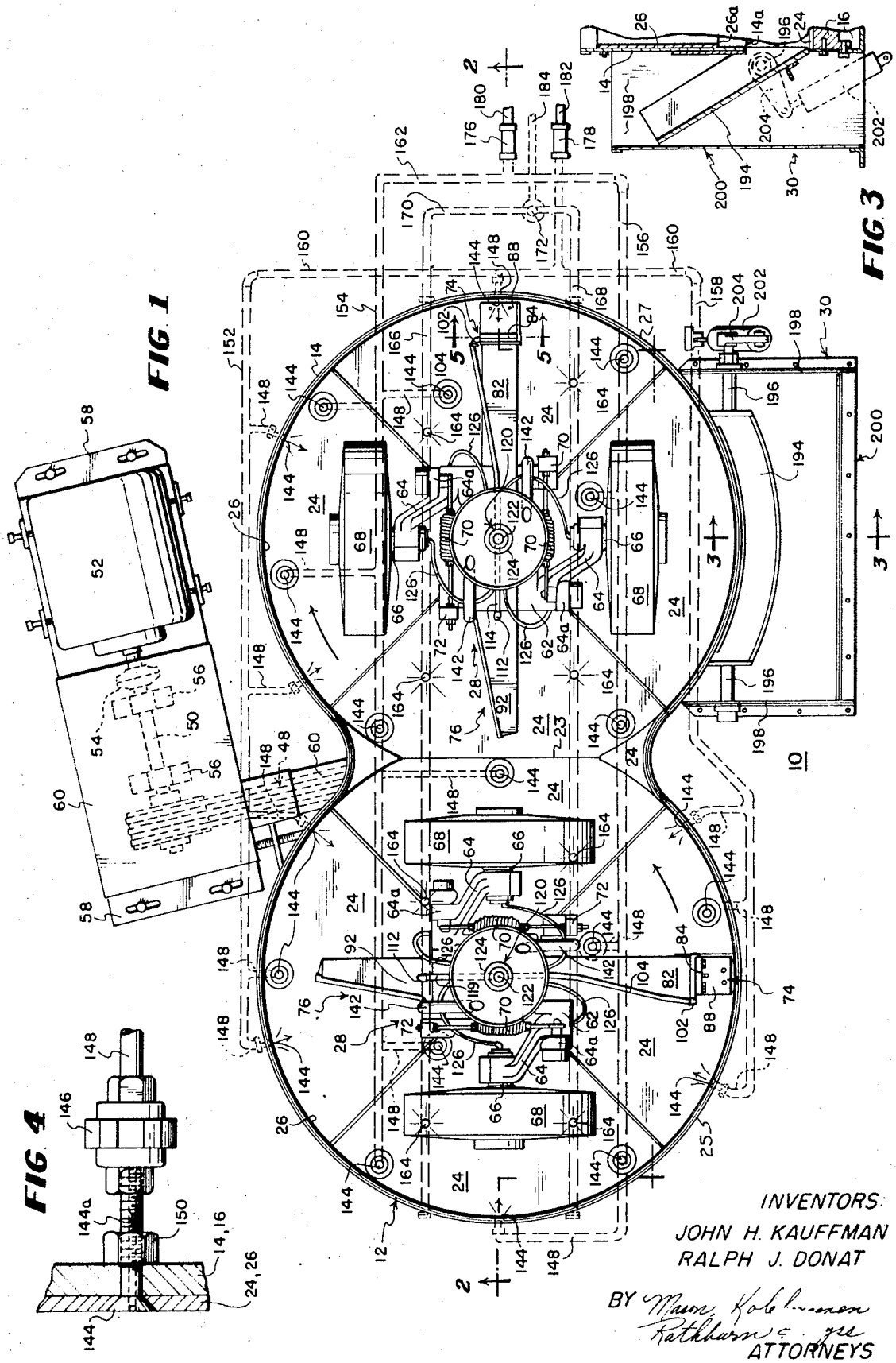

INVENTORS:
JOHN H. KAUFFMAN
RALPH J. DONAT

BY Mason, Kolehmainen,
Rathburn & Wyss
ATTORNEYS

MIXER SYSTEM

The present invention relates to a new and improved mixer for granulated material and the like, and, more particularly, to a new and improved mixer system including means for automatically controlling the addition of moisture to the material for cooling and lubricating the plows as they are moving around the material in the mixing chamber.

The mixer of the present invention is an improvement over the mixer system shown and described in U.S. Pat. No. 3,395,834, dated Aug. 6, 1968, which patent is owned by the same assignee as the present application.

In conditioning granular material, such as foundry sand and the like used in molding operations, it is desirable to provide extremely accurate control of the amount of moisture in the material so that the molding sand has the necessary green or wet strength required for a particular type of molding operation. In addition, because sand and other materials are abrasive and sometimes cause excessive wear on the plows and wall surfaces in direct contact therewith, it is desirable and an object of the invention to provide a new and improved mixer in which the wear is minimized and in which the energy expended in mixing the materials is also minimized.

In the present invention, the mixer is provided with one or more rotating plows for moving and mixing material around the mixing chamber, and means is provided for automatically wetting the material in the chamber and for providing cooling and lubrication for the plows to reduce and minimize wear and reduce the horsepower required for the mixing operation. Automatic control means is used in a moisturizing process on the sand so that a desired amount of moisture content is present in the finished product. Control of the moisturizing system is automatic and the fluid or moisture added serves a manifold purpose in lubricating and cooling the plows and in reducing starting loads and running loads on the drive motor of the mixing apparatus.

It is an object of the present invention to provide a new and improved mixer for granular material and the like.

More particularly, it is an object to provide a new and improved mixer of the character described employing automatic moisture control means therein for controlling the level of moisture content in the granular material being treated.

Another object of the present invention is to provide a new and improved mixer of the character described having means for cooling and lubricating one or more plows of the mixer, thereby reducing the energy required to move the plows and reducing the wear rate on the plows and adjacent surfaces.

Another object of the present invention is to provide a new and improved mixer wherein wetting or moisturizing of the material is accomplished automatically in a manner to provide for easier starting of the mixer, and accurate control of the mixer content is achieved.

Another object of the present invention is to provide a new and improved mixer of the character described having a moisturizing system operative to wet the material down prior to start-up of the mixer in order to provide for easier initial starting and to provide a thorough and complete distribution of the water throughout the sand mass in a minimum of operating time.

Another object of the present invention is to provide a new and improved mixer of the character described having means for wetting down the material after the rotary mixing operation of the mixer has stopped in order to prevent heat-baked crustations of material from building up in the mixing chamber.

The foregoing and other objects and advantages of the present invention are accomplished in a new and improved mixer system for granular material, and the like, comprising a mixing chamber having a wall surface and rotary plow means movable around said surface in close proximity thereto for mixing the material. The plow means has a lower edge portion running in direct engagement with the material closely adjacent the supporting wall surface in the mixing chamber, and fluid dispenser means is provided for delivering cooling and lubrication fluid onto the lower edge portion of the plow for cooling and lubricating the plow, while at the same time wetting the material. Control means is provided for direct control of the fluid passing into the material via the dispenser means, and the control means is automatic in operation to insure ease of starting, ample cooling and lubrication, and accurate selected level of moisture in the material.

For a better understanding of the invention, reference should be had to the following detailed description and the aforementioned U.S. Pat. No. 3,395,834, taken in conjunction with the claims herein and the drawings, in which:

FIG. 1 is a top plan view of a new and improved mixer system for granular materials, and the like, constructed in accordance with the features of the present invention;

FIG. 2 is a longitudinal, vertical, sectional view through the mixer taken substantially along line 2—2 of FIG. 1;

FIG. 3 is a transverse, fragmentary, vertical, cross-sectional view taken substantially along line 3—3 of FIG. 1;

FIG. 4 is an enlarged elevational view of one form of water injector in accordance with the present invention;

FIG. 5 is a fragmentary, enlarged, cross-sectional view taken substantially along line 5—5 of FIG. 1 and illustrating an automatic moisturizing, plow cooling and lubricating system in accordance with the present invention;

FIG. 6 is a fragmentary, enlarged, sectional view taken substantially along line 6—6 of FIG. 2.

Figure 7:
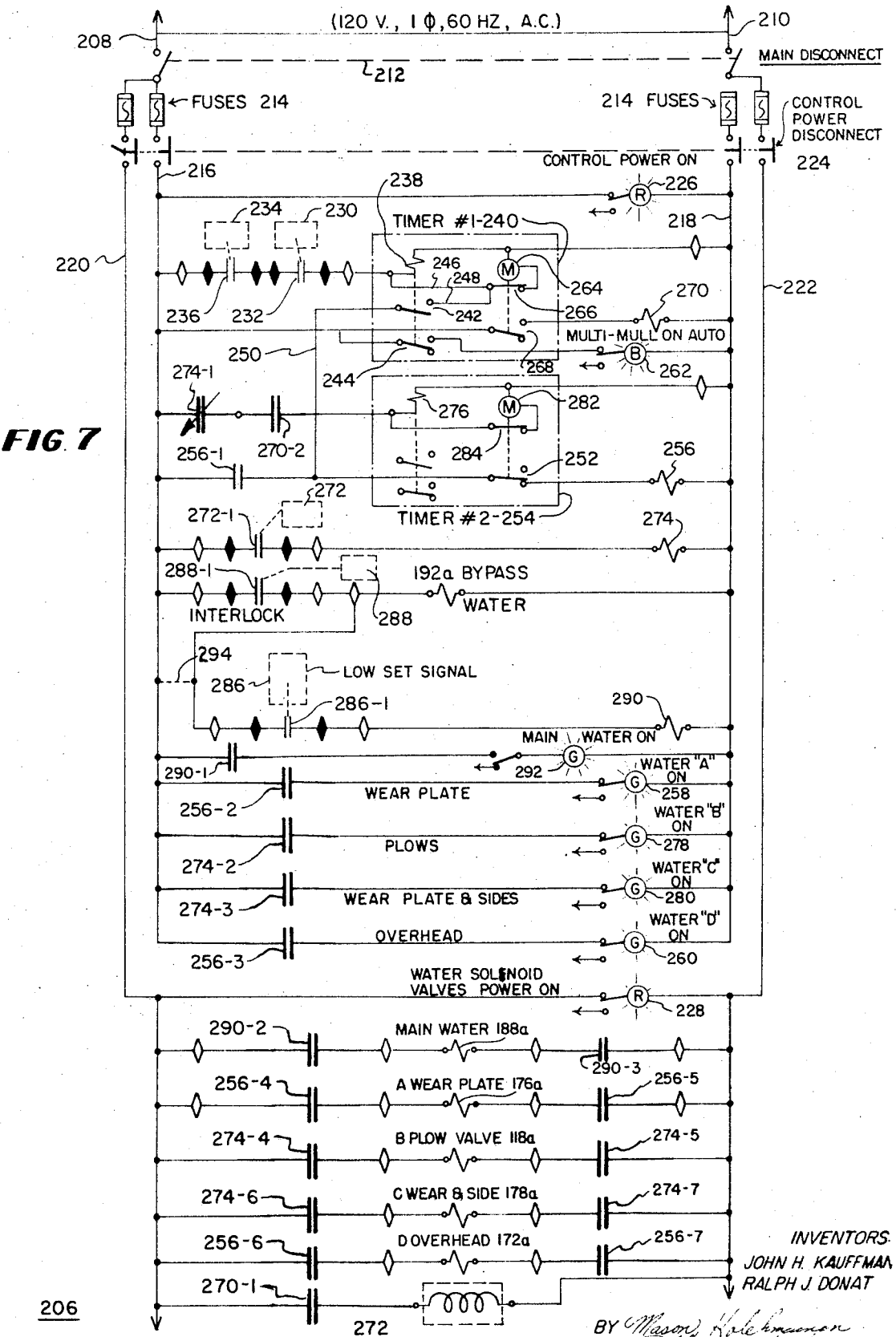
FIG. 7 is a schematic, electrical diagram of the control system for the moisturizing system of the invention.

Referring now, more particularly, to the drawings, therein is illustrated a new and improved mixer for granular material, and the like, constructed in accordance with the features of the present invention and referred to generally by the reference numeral 10. The mixer 10 includes a mixing chamber generally indicated as 12, having an upstanding, peripheral sidewall 14 and a bottom wall 16. As best shown in FIG. 1, the bottom wall is shaped somewhat like a figure eight and includes a pair of left- and right-hand, substantially circular sections 18 and 20 (FIG. 2), which sections are truncated along a common plane 23 and are joined together by a plurality of bolts 22. Each bottom wall is covered with a plurality of replaceable, wedge or pie shaped, wear plate segments 24, and the upstanding sidewall 14 is provided with replaceable wall liners 26. As best shown in FIG. 1, the mixing chamber 12 comprises a pair of substantially cylindrical left- and right-hand (FIGS. 1 and 2) subchambers 25 and 27, which are in communication along the plane 23 at the center of the mixer. Each subchamber is provided with a rotary mixing head assembly 28 driven to rotate about an upstanding vertical axis at the center. The granular material to be treated is first introduced into the left-hand subchamber 25 and is mixed and pulverized by the mixing head 28 which rotates in a counterclockwise direction (FIG. 1). The plows of the mixing head in subchamber 25 then deliver the material to the central region common to both subchambers 25 and 27 adjacent the center or junction plane 23, where the mixing head 28 in the right-hand subchamber 27, rotating in a clockwise direction, picks up material for continued mixing treatment and eventual discharge through an outlet opening 14a in the chamber sidewall (FIG. 3). The outlet opening controlled by a mixer discharge assembly generally indicated by the reference numeral 30 will be described in greater detail hereinafter. Each of the contrarotating mixing heads 28 is driven by an upstanding vertical drive shaft 32, which shafts are journaled for rotation in turret assemblies 34 positioned at the center of each of the respective subchambers. The shafts project downwardly through openings in the bottom wall 16 and are coupled to the upper end of output shafts 36 on a pair of right angle, high torque, gear reducers 38. The reducers are supported from the underside of the bottom wall 16, as shown in FIG. 2, and the reducers include a horizontal input shaft 40. The input shafts are interconnected to a common drive shaft 42 through a pair of couplings 44, and the shaft 42 is supported from the underside of the chamber bottom wall by a pair of downwardly extending bearing assemblies 46. The common shaft 42 is driven via a belt drive 48 from a shaft 50 coupled to the armature shaft of an electric motor 52 through a clutch 54 (FIG. 1). The shaft 50 is journaled in a pair of bearings 56 mounted on a motor base 58 along with the electric motor 52. The shaft 50 and belt drive assembly 48 are enclosed in a suitable protective housing 60 to prevent inadvertent engagement with the moving belts.

When the motor 52 is energized, the mixing head assemblies 28 contrarotate in the directions shown at relatively low speed about the respective vertical axes of rotation at the center of the subchambers. Because of the contrarotation, the general flow of materials is from the inlet or left-hand subchamber 25 (FIG. 1) to the outlet or right-hand subchamber 27 for eventual discharge after treatment controlled by the discharge assembly 30.

In accordance with the present invention, each of the mixing head assemblies 28 includes a turret head 62 mounted adjacent the upper end of the drive shaft 32 and each turret head supports a pair of wheel supporting arms 64 mounted for pivotal movement on opposite sides of the turret head. At the lower end each arm includes a mulling wheel support shaft 66 on which is carried a relatively large, heavy, mulling wheel 68 journaled for free rotation. As the mixing head assemblies 28 rotate around the subchambers, the mulling wheels knead and pulverize the material against the wear plate sections 24 on the bottom wall 16. This breaks down large lumps of agglomerated particles of sand or other materials being treated. For the purpose of controlling the mulling pressure exerted by the wheels on the material, spring biasing assemblies 70 are interconnected between fixed upstanding arms 72 on the turret head, and each upstanding arm 64a of the wheel support members 64, as best shown in FIG. 2. The biasing assemblies 70 are adjustable to vary the amount of mulling pressure that the mulling wheels 68 exert on the material in the mixing chamber as the mixing heads 28 rotate. Each mulling wheel traverses a circular path around its subchamber, which path is spaced approximately midway between the central turret 34 and the inside surface of the adjacent outer sidewall liner 26.

In accordance with the present invention, each of the mixing head assemblies 28 includes an outer plow assembly 74 and an inner plow assembly 76. The outer plow assembly includes a relatively short plow member 78 adapted to move in a circular path adjacent the outer periphery of the mixing chamber bottom wall 16 and an inner plow 80 (considerably longer than the outer plow) for moving material away from the turret casing 34. Both plows act to move the material into the path traversed by the mulling wheels 68.

The outer plow assemblies 74 are supported from elongated, outwardly extending radial arms 82 directed radially outwardly of an angle of about 90 degrees relative to the axes of the mulling wheels 68, as shown in FIG. 1. The outer plows are secured to the lower end of support legs 84 extending downwardly from the outer end of the radial arms 82. The inner plow assemblies 76 are carried downwardly by extending support legs 86 which are attached directly to the respective mixing heads 62.

As best shown in FIG. 5, the plow support legs 84 for the outer plows have a horizontal plow supporting plate 88 at the lower end spaced above and parallel to the mixing chamber bottom wall 16. The outer plows are detachably secured to backing members 90 of the angular cross section having upper horizontal flanges secured to the underside of the plates 88. The inner plow assembly 76 includes a plow support plate 92 at the lower end of the vertical support leg 86, and an angular, cross section, plow backing member 94 is secured to the support plate for mounting the relatively long inner plow 80, a shown in FIG. 6.

Referring now, more particularly, to FIGS. 5 and 6, as the inner and outer plow members 80 and 78, respectively, move along with their lower edges in close proximity to the bottom wall 16 of the mixing chamber as the mixing heads 28 rotate, the forward faces of the plows directly engage the granular material causing the same to be elevated and turned over in a mixing action. At the same time, some of the material passes between the lower edge of the plows and the upper surface of the adjacent wear plate segments 24 on the bottom wall structure 16. This causes intense abrasive action on the plows, resulting in high wear occurring along the lower edge and front cover face of the plows. In addition, because of the abrading action, intense heat is developed in the plow, and even though the plow surfaces are usually surface wear resistant materials, such as "Stellite" or "carbide," the intense heat causes the material to lose at least some of its toughness or wear resistant capability.

In accordance with the present invention, in order to cool the lower edge portion of the inner and outer plows 80 and 78, and to lubricate and wet material in the region directly beneath the lower edge of the plows along the advancing face, the outer plow is provided with a liquid supply nozzle 96 (FIG. 5) having a relatively wide, horizontal, outlet opening 96a for directing a stream or spray of water directly onto the lower edge portion of the back side of the plow. The inside plow is provided with one or more similar nozzles 106. The liquid impinging upon the plows prevents excessive plow temperatures from developing and, accordingly, permits the material of the plow to maintain an effective hardness and wear is thereby increased. In addition, the cooling water dispensed by the nozzles provides lubrication reducing the energy required for moving the plows through the material. Besides the beneficial cooling and lubrication effects of the water issuing from the nozzles 96 and 106, the material is moisturized and the moisture content of the material being treated in the mixing chamber is elevated to a selected level. The nozzle 96 is supplied through an elbow 98 and a vertical supply conduit 100 carried by the plow support leg 84. At the upper end, the liquid supply conduit 100 is connected by an elbow 102 to a flexible conduit 104 which extends radially inwardly towards the center of the mixing head assembly along the radial arm 82. Liquid for the inner plows 80 is supplied to the nozzles 106 for discharge through an elongated, relatively wide, horizontal, discharge slot 106a. These nozzles spray cooling and lubricating water against the back plows 80 along the lower edges thereof and are supplied through elbows 108 and conduits 110. These conduits are connected through elbows 112 to flexible hoses 114.

From the foregoing description, it will be seen that the nozzles 96 and 106 provide a plurality of useful functions in connection with their respective plows 78 and 80. Water dispensed from these nozzles acts to cool the plow by direct contact with the back of the plows and lubricates the material to reduce friction. In addition to cooling and lubricating action, the water is used to moisturize the material in the chamber to a desired moisture level and thereby reduce the time required for the material to fully assimilate the water added by other means. The cooling and lubricating effect of the liquid directly applied to the plows is especially advantageous in that the initial start-up torque or force required for intitial rotation of the plow is greatly reduced. Moreover, because of the cooling effect, plow temperatures are reduced and plow wear is reduced. After rotation of the mixing heads has commenced, the energy required to move the plows through and mix the material is greatly reduced because of the lubricating effect so that the overall energy cost per unit volume or weight of material being treated in the apparatus 10 is reduced. In addition, down time caused by the necessitation of change or replacement of plows 78 or 80 has been significantly reduced over that of similar machines not having the plow cooling and lubricating features of the present invention. The cooling water is supplied at the point of most intense mixing action, so that excellent moisture stability and uniformity of mixing action are achieved.

In accordance with the present invention, water for the spray nozzles 96 and 106 on the respective plows is supplied through a plow supply line 116 having a solenoid control valve 118 therein. On each of the mixing head assemblies 28 there is provided an upstanding, tubular structure generally referred to as 120, which structure is secured at its lower end on an upper surface of the mixing head 62 in coaxial alignment with the shaft 32. As shown in FIG. 2, the structures 120 include a center fluid conduit 122 and an outer concentric conduit 124. As best shown in FIG. 1, cooling and lubricating water for the plows is supplied by the outer concentric conduits 124 which are connected to the flexible hoses 114 and 104. The center conduits 122 are supplied with grease under pressure for use in lubricating the wheel axles 166 and the axles which pivotally support the muller wheel supports 64. Grease is directed into the axle areas by a plurality of flexible lubricating hoses 126 which are connected at their outer ends to the appropriate lubrication points on the axles and bearing areas and at their inner ends the grease hoses are connected to the central grease supply conduits 122.

In order to supply grease to the center conduits 122 of the rotating structures 120 and to supply water to the outer conduits 124 on the mixing heads 28, dual fluid, rotary, slip joint, coupling connectors 128 are provided, and these connectors are supplied grease through fixed lines 132 and are supplied water through branch conduits 134 connected to the plow water supply line 116.

In addition to providing for the supply of cooling, lubricating, and wetting fluid directly onto the plows 78 and 80, the mixer 10 also includes provisions for directing water to wet the material generally in the path of the mulling wheels 68, and for this purpose, reservoirs or tanks 136 are mounted on the mixing heads 62. These tanks are supplied with water at a controlled rate through branch supply lines 138 with flow control valves 140 therein to adjust the flow rate. Water from the reservoirs 136 is directed downwardly onto the material in the mixing chamber through pairs of downwardly and radially outwardly sloping distribution conduits 142. The lower ends of the distribution conduits are spaced above the maximum level of the material in the mixing chamber and are positioned approximately midway between the leading edge of one mulling wheel and the trailing edge of an opposite wheel.

The mixer system 10 also includes a plurality of liquid injectors 144 (FIG. 4) mounted in the bottom wall structure 16 of the mixing chamber and position around the periphery of the chamber adjacent the upstanding sidewall 14 and around the turrets 34. The liquid injectors 144 provide water in high velocity jet streams directed upwardly from the bottom wall of the mixing chamber into the sand and, in addition, injectors 144 are mounted in the sidewall 14 to inject water in a radially inward horizontal direction from around the outer periphery of the mixing chamber. As best shown in FIG. 4, the liquid injectors or nozzles 144 take the form of flush head cap screws used for securing the wear plate sections onto the bottom wall 16 and the sidewall liners 26 to the upstanding sidewall 14 of the mixing chamber. The liquid injector cap screws 144 are used in place of normal cap screws provided for securing the wear plate segments and wall liners in place. Each injector screw 144 is formed with an axially aligned, liquid passage 144a extending from the head to the opposite end and in communication with a union coupling 146 for detachably connecting the injector screw to a water supply branch conduit 148. The injector screws are secured in place on the chamber walls by locknuts 150 which are tightened against the outside surfaces of the bottom wall or sidewall structure of the mixing chamber. The outside end or tip of each injector 144 is connected to a supply branch conduit 148, and the branch conduits are supplied by one of several supply manifolds 152, 154, 156, and 158. The outside supply manifolds 152 and 158 are interconnected by a cross manifold 160, and the inside supply manifolds 154 and 156 are interconnected by a cross manifold 162, as best shown in FIG. 1.

In addition to the water injected into the material through the injector nozzles 144, water is also applied to the upper surface of the material in the mixing chamber when the mixing heads 28 are not in rotation. This is done by means of a plurality of overhead spray nozzles 164, which are supplied with liquid through a pair of manifolds 166 and 168 interconnected by a cross manifold 170.

As shown in somewhat schematic form in FIGS. 1 and 2, the water supplied to the overhead spray nozzle 164 is controlled through a solenoid valve 172 provided in a supply line 174 leading to the cross manifold 170. Water supplied to the injector nozzles 144 in the bottom and sidewalls of the mixing chamber is controlled by a pair of water supply valves 176 and 178 in respective supply conduits 180 and 182 connected to the cross manifolds 162 and 160. Shown in more schematic form in FIG. 2, the supply lines 174, 180, and 182 are interconnected by appropriate fittings generally indicated as 184, and these fittings, along with the plow supply conduit 116, are supplied through a large main water supply conduit 186 having a solenoid control valve 188 therein for controlling the flow.

In order to provide for a reduced water flow rate during initial start-up of the apparatus 10, a bypass line 190 having a flow restriction therein is provided to bypass the main water supply valve 188. The bypass line is provided with a solenoid control valve 192, which is energized during the turning cycle to supply water at a reduced rate before full load is achieved in the mixing apparatus while the main valve 188 is closed.

The mixer 10 includes an automatic door control system, as shown and described in the aforementioned U.S. Pat. No. 3,395,834, and reference should be had to this patent, which is incorporated herein by reference. Briefly, the automatically controlled mixer discharge system comprises the door assembly 30, which includes a movable door 194 pivotally supported on axles 196 journaled for rotation on the sidewalls 198 of a discharge chute or enclosure 200. As shown in FIG. 3, the door 194 is in a closed position covering the opening 14a in the chamber sidewall 14 and, when the door is open, it is pivoted by the support axles 196 in a clockwise direction so that the lower edge of the door moves away from the lower edge of the discharge opening 14a to permit discharge of material from the outlet subchamber 27 of the mixing chamber 12.

Intermediate positions of the door between fully open and fully closed positions are provided, and for this purpose a pneumatic cylinder 202, having one end pivotally connected to a fixed pivot point relative to the mixing chamber and an opposite end connected to the axle 196 through a lever arm 204, is provided. As described in the aforementioned U.S. Pat. No. 2,395,834, the cylinder 202 is extended or contracted in accordance with electrical signals received from a meter relay having high and low set points and supplied with information from a current transformer which has a primary winding adapted to sense the load or current in the motor 52, which drives the mixing head assemblies 28. When the meter relay signals a low load condition, the cylinder is contracted in length and moves the door 194 toward the closed position, thereby to retain more material in the mixing chamber and increase the load. On the other hand, when the meter relay senses a high load condition, the cylinder 202 is expanded to pivot the door toward a more open position (FIG. 3) so that material is discharged from the mixing chamber at a higher rate, thereby reducing the motor load. The automatic door assembly 30 thus provides modulating door action to maintain a relatively constant load of material in the mixing chamber and thus provides extremely stable results in material consistency over extended periods of time during which the conditions of the materials entering the mixing chamber 12 may change considerably.

In accordance with the present invention, a moisturizing control system, generally indicated in schematic form in FIG. 7 and referred to by the reference numeral 206, is integrated in combination with the automatic door controlling system of the mixer system 10, as described herein, and as more fully set forth in the aforementioned patent incorporated herein by reference. The moisture control system 206 is operative to time and adjust the rate and place of addition of moisture to the material for lubrication, cooling, and wetting purposes by controlling the various solenoid water valves 118, 172, 176, 178, 188, and 192, respectively. In FIG. 7, the solenoid coils of these valves are referred to by respective reference numerals with the addition of the suffix "a."

The control system operates on 120 volt, single phase, 60 cycle, A.C. power supplied from a pair of A.C. line terminals 208 and 210. Power passes through a main disconnect switch 212 via pairs of fuses 214 on each side to control power lines 216 and 218 and to solenoid power lines 220 and 222, through a control power disconnect switch 224 having a contactor for each of the respective lines. When the power control disconnect switch 224 is closed, this fact is indicated to the machine operator by means of a (push-to-test) control power "on" light 226 and by a similar (push-to-test) solenoid valve "on" light 228. In order to ease or reduce the starting load on the motor 52 which drives the mixing heads 28, the control system 206 provides an automatic cycle for prewetting the material in the mixing chamber for a predetermined time interval before actual rotation of the mixing head 28 commences. Moist material is easier to move than dry material and, by prewetting the material, the starting torque required by the motor 52 may be reduced and wear and tear on the mixing heads and drive system are thereby reduced.

The motor 52 is started in a conventional manner through a starting push-button assembly having a holding coil therein indicated generally by the reference numeral 230. The push-button assembly 230 includes a pair of contacts 232 which are closed when the starting cycle is initiated. In series with the contacts 232 is another pair of contacts which are closed when the mixer door control system 30 is operated in the automatic mold, as more fully described in the aforementioned U.S. Pat. No. 3,395,834. A mode control switch 234 operates to close a pair of contacts 236 in series with the start contacts 232. When the mode control contacts 236 and the start control contacts 232 are both in the closed condition, electrical power is supplied from the lines 216 and 218, respectively, across a clutch coil 238 of a timer No. 1, indicated as 240 in the drawings. The timer includes a clutch coil 238 which operates a pair of switches 242 and 244, and when the coil is energized the switch 242 is closed to supply current through a pair of internal leads 246, 248 in the timer 240 to an external lead 250 which passes through a pair of contacts 252 in a second timer 254 (timer No. 2) to energize a control relay coil 256. Energizing the relay coil 256 causes a first set of contacts 256-1 to close and provides a holding circuit for maintaining the coil 256 in energized condition until the switch 252 in the timer No. 2 is opened. The control relay coil 256 includes additional sets of contacts 256-2 through 256-7, which are normally open and which are closed whenever the coil is energized. Contacts 256-2 provide current to illuminate a water "on" light 258, which indicates that water is being supplied to the mixer 10 through certain injector nozzles 144 which are supplied through the lines 154 and 156 controlled by the solenoid valve 176. In addition, a set of contacts 256-3, when closed, illuminates another water "on" indicator light 260 which advises the operator that water is being supplied through the overhead nozzles 164 which are controlled by the overhead valve 172.

Contacts 256-4 and 256-5, when closed, provide current from lines 220 and 222 to energize the solenoid valve winding 176a while contacts 256-6 and 256-7 supply current for operating the solenoid valve coil 172a to open the respective valves to provide the desired prewetting water flow.

Referring to timer No. 1, when the clutch coil 238 is energized, the switch 244 is closed to supply current for illuminating the "MULTI-MULL ON AUTO" light 262 which indicates that the mixer is turned on and in the automatic mode of operation. Simultaneously, with energization of the coil 238, a timing motor 264 of timer No. 1 is energized and begins to rotate for a prescribed time period. Timer motor 264 controls a pair of switches 266 and 268, and when the timer motor 264 is timed out at the end of an adjustably preselected time interval, the switch 266 is opened to de-energize the timer motor, and simultaneously the switch 268 moves to complete a circuit to energize a relay coil 270. The relay coil 270 controls a pair of contacts 270-1 for energizing a motor clutch engaging relay control solenoid 272 which causes the clutch 54 between the motor 52 and the drive shaft 50 to engage and begin rotation of the mixing heads 28.

From the foregoing, it will be seen that after the operator initiates starting action by activating the pushbutton 230, a prescribed time interval takes place during which interval the material in the mixing chamber 12 is prewetted by water supplied and controlled through the valves 176 and 172. Prewetting continues for an adjustable time interval as selected by the timer No. 1, or 240, and upon timing out, the mixing heads 28 then begin rotation. The relay coil 270 also controls a pair of contacts 270-2 which are in series with normally closed contacts 274-1 controlled by a relay coil 274. The relay 274 is in series between the power lines 216 and 218 and a pair of contacts 272-1 which are controlled by a clutch relay coil 272. The contacts 272-1 are closed any time the motor clutch 54 is engaged and the mixing heads 28 are in rotation. The contacts 270-2 and 274-1 are in series with a clutch coil 276 of timer No. 2; however, the contacts 270-2, which are normally open, are not closed until the end of the operating cycle of timer No. 1, at which time the multimull mixing heads start to rotate by engagement of the clutch 54. When the clutch 54 is engaged and the motor 52 is driving the mixing heads 28, the contacts 272-1 are closed and the control relay 274 is energized. When this occurs, the normally closed contacts 274-1 are opened, and this cuts off power to the clutch coil 276 of the timer No. 2, numeral 254. The control relay 274 also includes contacts 274-2, which are closed to energize a pair of (push-to-test) water "on" indicator lights 278 and 280, which lights indicate to the operator of the apparatus 10 that water is being supplied to the material at the plows and along the wear and side plates that are controlled by the valve 178. The relay 274 also controls additional contacts 274-4 and 274-5 which are in series with the solenoid winding 118a of the water control valve 118 which supplies water to the plow lubricating and cooling system through the conduit 116. The contacts 274-6 and 274-7 are in series with the solenoid coil winding 178a for opening the water control valve 178 which supplies water to some of the injector nozzles 144 in the mixing chamber sidewall and bottom wall.

When the motor clutch control solenoid 272 becomes disengaged at the end of an operating cycle, the contacts 274-1 return to the normally closed position while contacts 274-2 through 274-7 return to their normally open position. When this occurs, the water "on" lights 278 and 280 go out and the solenoid valve windings 118a and 178a are no longer energized to supply water to the plows and the ejector nozzles 174 which are controlled by the valve 178. When the contacts 274-1 return to the normally closed position, a circuit is completed to energize a timer motor 282, in the timer No. 2, to commence the timing cycle. The timer motor is operated to actuate the timer motor switch 252 and an additional switch 284, and at the end of the timing cycle, the switch 284 is opened to de-energize the timing motor while the switch 252, which was closed to energize the control relay 256, opens also. When the relay 256 is de-energized, the contacts 256-1 through 256-7 return to the open position, and the water supplied through the valves 176 and 172 is shut off.

From the foregoing, it will be seen that after the mixing head 28 stops rotation, the timer No. 2 is set into operation and additional post-wetting of the material for a prescribed time period is accomplished through the valves 176 and 172, and these valves remain open for a time interval after the physical mixing process has been terminated. This additional water, especially the water supplied from the overhead nozzles 164, helps prevent any material left in the mixing chamber 12 from forming a hard, baked-on crust over the top and, accordingly, by post-wetting the material the next start-up sequence is easier and requires less motor torque because of the absence of hardened formations or crusts of material.

From the foregoing, it will be seen that timer No. 1 (240) is active to prewet the material before the mixing heads 28 begin rotation, and after the mixing interval is completed and rotation of the mixing heads stops, the timer No. 2 (254) goes into operation to provide for the post-wetting of material to prevent hardening or baking of the crust on the upper layer, which crustation might hinder the starting up sequence for the next mixing operation.

In order to prevent flooding of the material or excessive water introduction during the start-up interval or at any time when the material volume in the mixing chamber 12 is below a preselected level, the control system 206 includes a means for limiting the initial water flow rate. In the previously mentioned automatically controlled discharge system shown in U.S. Pat. No. 3,395,834, incorporated herein by reference, the meter relay operates pairs of high-set and low-set contacts in response to load conditions on the motor. Whenever the current supplied to the electric motor 52 falls below a low-level-set point as sensed by the meter relay (indicated in FIG. 7 by the reference numeral 286), a pair of low-set contacts 286-1 are opened. When the load signal sensed by the meter relay 286 is above the low-set point, as adjustably selected, the contacts 286-1 are closed. In order to further insure that an ample material supply is forthcoming into the mixer chamber 12, an interlock system is provided including a pair of contacts 288-1, which contacts are normally open and which are closed whenever material feed conveyor or elevator or other equipment set up to feed the mixer 10 is in operation to provide a material flow into the inlet subchamber 25 of the mixer. Accordingly, when material is actively supplied to the mixer system, the contacts 288-1 are closed, and this completes a circuit to energize the solenoid coil 192a of the bypass water valve 192. When this bypass valve opens, the water is supplied from the inlet conduit 186 through the restricted bypass conduit 190 at a reduced rate and from there is supplied to the piping setup shown in FIG. 2 to the respective water control valves 118, 172, 176, and 178. In order to provide full water flow after the load, as sensed by the meter relay 286, reaches a level above the low-set point, the contacts 288-1 and 286-1 are arranged in series with a control relay 290. The control relay 290 has a pair of contacts 290-1 which are in series with a (push-to-test) main water valve indicator light 292, which light indicates to the operator that the load is above the low-set level on the mixer and that full water supply is being delivered. The relay 290 controls pairs of contacts 290-2 and 290-3 in series with the main water valve solenoid 188a which, when energized, opens the valve 188 to permit full flow of water to the various lubricating, cooling, and wetting systems in the mixer system 10.

Whenever the load in the mixer falls below the low-set point or whenever the belt feeder or other material feeding devices supplying the mixer system have been shut down, the main water valve 188 is closed and, furthermore, water is only supplied through the bypass valve 192 as long as the interlock contacts 288-1 are closed. If desired, the interlock contacts may be removed from series arrangement with the low-set meter relay contacts 286-1, and a jumper 294 (dotted lines) is provided to connect one side of the contacts 286-1 with the power line 216. In this arrangement, the bypass valve 192 is not sensitive to whether or not material feeding equipment (represented schematically by the number 288) is in an operative state and thus water may be supplied to the system whenever the control power disconnect switches 224 are closed.

From the foregoing, it will be seen that the mixer system 10 includes a new and the mixer moisturizing control system for moisturizing the material in the mixing chamber 12 and for lubricating and cooling the plow blades which are subjected to intense wear and high temperature. The control system provides for a unique and selective dispensing of water for desired time intervals and flow rates and at particular points and locations within the chamber which are chosen to insure uniform consistency of the finished material as it is discharged. The control system provides for easy initial start-up of the mixing heads with minimum starting torque by providing a prewetting action and moisturizing of the material before the physical mixing actually commences. Moreover, minimum energy is required for driving the mixing heads because of the lubrication features and, after a mixing operation has been completed, the system prevents the buildup of a hard crust on top of the material by the post-wetting process.

While there has been shown and described a single embodiment of the present invention, it will be apparent to those skilled in the art that various changes and modifications may be made without departing from the invention in its broader aspects, and it is therefore contemplated in the appended claims to cover all such changes and modifications as fall within the true spirit and scope of the invention.

What is claimed as new and desired to be secured by Letters Patent of the United States is:

1. A mixer for granulated material and the like comprising a mixing chamber having a wall surface; plow means for moving material around said chamber including an edge portion movable across and in close proximity to said surface; and dispenser means for delivering coolant fluid onto said edge portion for cooling the same and wetting said material, said plow means including an advancing face traveling forwardly into said material and a back face, said dispensing means directing coolant fluid onto said back face in a forward direction along said lower edge portion.

2. The mixer of claim 1 including control means for regulating the flow rate of coolant fluid delivered by said dispenser means.

3. The mixer of claim 1 including a mixing head mounted for rotation in said chamber about an axis normal to said surface and including arm means extending outwardly of said axis for supporting said plow means and said dispensing means.

4. The mixer of claim 3 wherein said chamber includes an upstanding sidewall parallel of said axis and spaced outwardly of and in close proximity to a circular path traversed by an end of said plow means, and liquid injector means for directing liquid into the material around at least a portion of said path for cooling the material and lubricating between said edge portion of said plow means and said wall surface of said chamber.

5. The mixer of claim 4 including liquid spray means above said chamber for cooling the upper surface of material in said chamber.

6. A mixer for granulated material and the like comprising a mixing chamber having a bottom wall and an upstanding sidewall; a mixing head in said chamber mounted for rotation about an upstanding axis for moving said material in a circular path around the chamber to mix the same; first water injector means on said sidewall for introducing cooling water into the material around at least a portion of the periphery of said circular path, second liquid injector means for introducing cooling water into the material from spaced locations on said bottom wall, third liquid injector means for introducing cooling water onto the upper surface of said material in said chamber, said mixing head including at least one plow having a lower edge movable in a circular path closely above said bottom wall and fourth liquid injector means for introducing cooling water along said lower edge.

7. The mixer of claim 6 including automatic control means for operating said water injector means at preselected times and flow rates.

8. A mixer for granulated material and the like comprising a mixing chamber having an outlet for discharging material; door means movable to open and close said outlet; a mixing head including at least one plow means movable around said chamber for agitating said material; motor means for driving said mixing head; liquid dispenser means for wetting material in said chamber and control means sensitive to the operative condition of said motor means for controlling said dispenser means to operate at selected times and rates, said control means includes first timer means for controlling said dispenser means to wet said material for a timed interval before said motor means is rendered operative.

9. The mixer of claim 8 wherein said control means includes means for controlling said dispenser means to wet said material whenever the output of said motor means as sensed by said control means reaches a selected level.

10. The mixer of claim 8 wherein said control means includes second timer means for controlling said dispenser means to wet said material for a timed interval after said motor means is shut down.

* * * * *